Oct. 1, 1929.  J. J. REBMAN  1,729,896
AUTOMOBILE DRIVING MECHANISM
Filed May 18, 1928  2 Sheets-Sheet 1
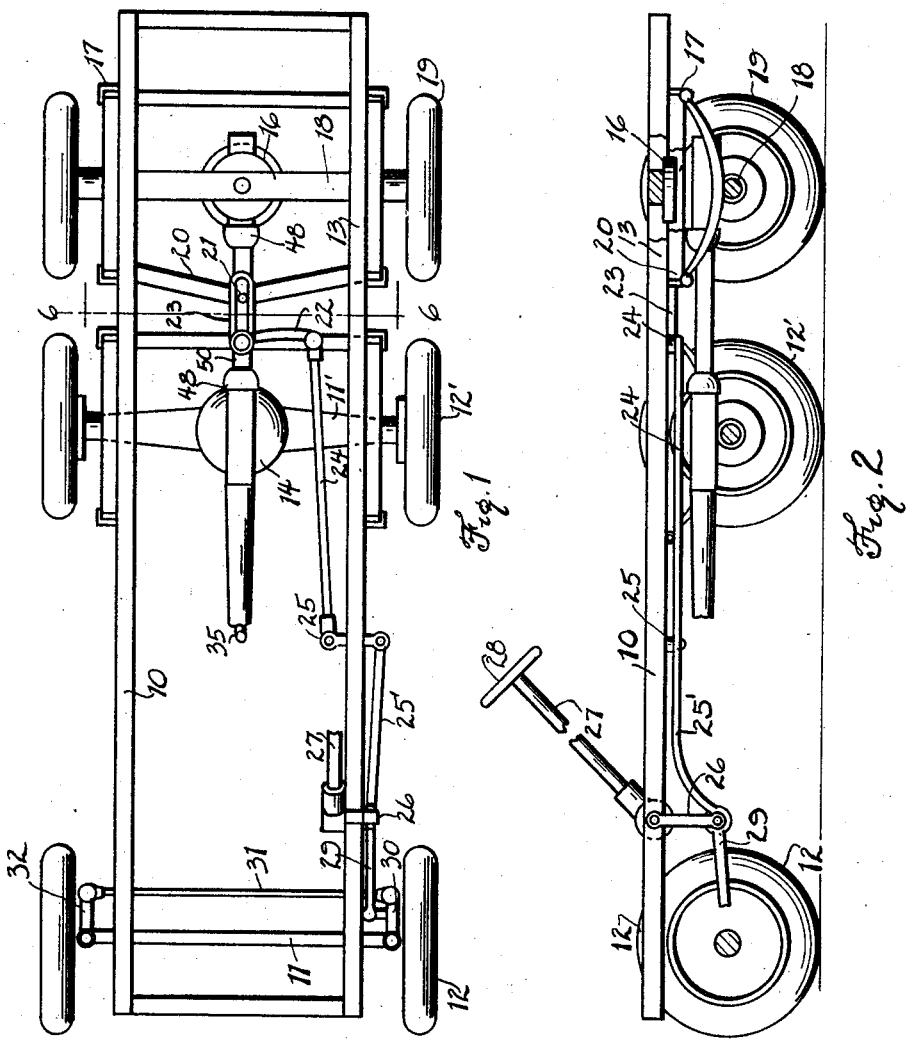
Inventor
Johan J. Rebman Oct. 1, 1929. J. J. REBMAN 1,729,896
AUTOMOBILE DRIVING MECHANISM
Filed May 18, 1928 2 Sheets-Sheet 2

Inventor
Johan J. Rebman

By Jack A. Schley
Attorney

Patented Oct. 1, 1929

1,729,896

UNITED STATES PATENT OFFICE

JOHAN J. REBMAN, OF DALLAS, TEXAS

AUTOMOBILE DRIVING MECHANISM

Application filed May 18, 1928. Serial No. 278,713.

This invention relates to automobile driving mechanism and particularly to an improvement upon my prior Patent No. 1,235,055, dated July 31, 1917, by providing extension gearing for driving the shiftable rear axle therein so as to apply power to the four rear wheels of a six wheel vehicle.

In the use of the steering apparatus disclosed in my before-mentioned patent the trailer axle is shifted laterally and if a drive shaft be extended from the preceding axle the rear end of such shaft extension connected to the trailer axle must travel transversely in an arc with its center at such preceding axle. This movement of the drive shaft incident to the steering of the rear wheels requires an elongation of the shaft connections and provision is made therefor by the telescoping joints between the universal gearings and the axle driving gearings. To properly enclose this shaft and gearings, housings are provided having tubular casings with ball and socket connections therewith and a telescoping joint at their intersecting ends.

The invention has for an object to provide a novel and improved construction of extension driving shaft comprising spaced universal gearings fixed to a solid connecting shaft and each gearing having a telescoping member extended therefrom and axially shiftable upon an axle driving gear.

Another object of the invention is to provide a four wheel chassis with a trailer axle and wheels pivoted upon a frame therefrom, said axle having a forwardly extending pin co-operating with a slotted crank lever having an operating rod extending to the steering gear, together with an extension shaft from the rear axle of the chassis to the trailer axle and provided with universal joints at its opposite ends having telescoping connection with the axle operating gears.

A further object of the invention is to present a new construction of casing for the extension drive shaft comprising a fixed spherical housing formed in separable members and an inner ball member provided with bearings for the shaft connection from a universal gearing within the ball, the abutting tubular sections of said casing having a telescoping joint to permit elongation thereof.

A construction designed to carry out the invention will be hereinafter described, together with other features of the invention.

Figure 3:
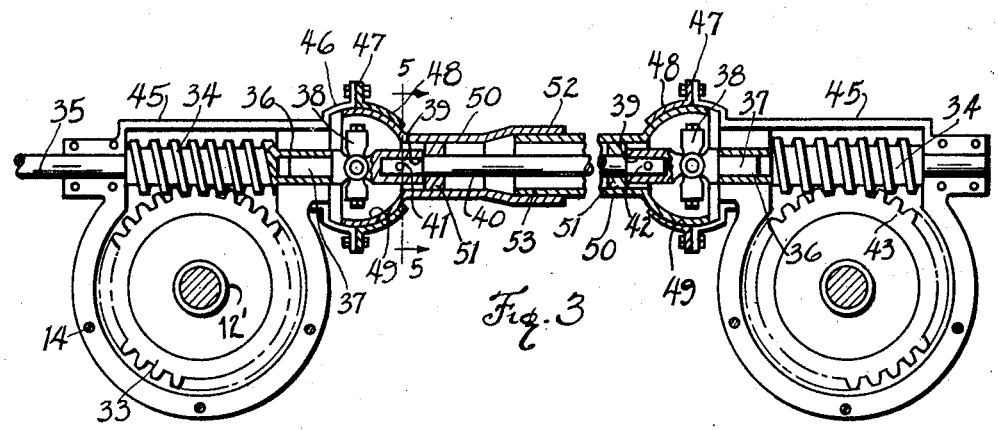
Figure 4:
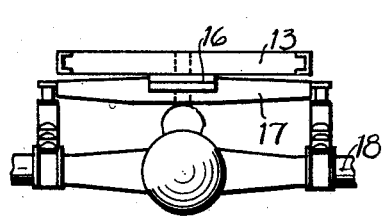
Figure 5:
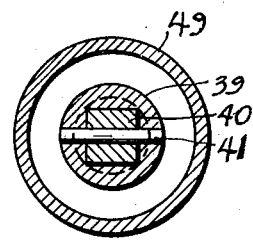
Figure 6:
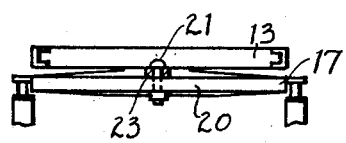
Figure 7:
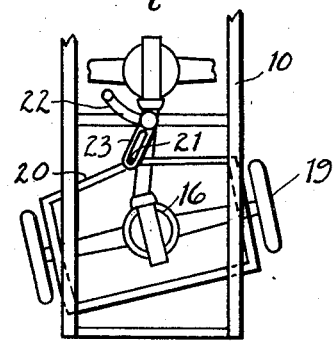

The invention will be more readily understood from a reading of the following specification and by reference to the accompanying drawings, in which an example of the invention is shown, and wherein:

Fig. 1 is a plan of the invention applied,
Fig. 2 is a side elevation thereof, with parts in section,
Fig. 3 is an enlarged section of the driving extension,
Fig. 4 is a rear elevation at the trailer axle,
Fig. 5 is a section on the line 5—5 of Fig. 3,
Fig. 6 is a similar view on the line 6—6 of Fig. 1, and
Fig. 7 is a detail plan of the driving connection between the rear and trailer axles.

Like numerals refer to like parts in the several figures of the drawings.

The invention is applicable to various constructions of chassis for automobiles, particularly trucks, and in the form shown the chassis frame 10 is provided with the usual front axle 11 and wheels 12 and also with the rear axle 11' and wheels 12' having the ordinary differential disposed within the housing 14. The frame 10 is extended rearwardly from the axle 12' as at 13 and provided with the fifth wheel or bearing 16 for rotative movement of a truck 17 which carries the trailer axle 18 with wheels 19.

This truck is formed with a forwardly inclined portion 20 having a steering pin 21 by which the truck may be shifted in a curved path upon its bearing 16 as a center for steering purposes. This shifting is effected in conjunction with the front wheels, by means of a crank lever 22 having a slotted arm 23 embracing the pin 21 and a rod 24 extended from its other end to a rock lever 25 upon the frame. The lever 25 is connected by a link 25′ with a depending arm 26 from the steering shaft 27 having the usual operating wheel 28. This arm is also connected by a link 29 with one of the front wheel steering knuckles 30 and such knuckle is provided with a cross rod 31 to the opposite knuckle 32. Such a construction provides for simultaneously shifting both the front and trailer wheels by direct connections and without lost motion.

The differential upon the rear axle 11′ is driven by a gear 33 meshing with a worm 34 upon the main drive shaft 35 which extends forwardly to the engine, not shown. This worm is provided with a sleeve 36 having an angular aperture to form a telescoping fit with the stud shaft or axle 37 from the universal gearing 38 which is formed at its opposite side with a socket 39 to receive one end of the extension drive shaft 40 secured therein by a pin 41. The opposite end of the shaft 40 is similarly secured by a pin 42 in the socket 39 of a corresponding universal gearing 38 arranged reversely to the first universal, as shown in Fig. 3.

The stud shaft 37 of the reversed universal gearing has a telescoping fit within the angular aperture of the sleeve 36 from the second worm gear 34 which drives the gear 43 for the trailer axle. The parts used are thus duplicated and being reversible may be interchanged when it is desired to compensate for wear or for other reasons.

Each of the worms and gears is enclosed by an assembled housing 45 forming part of the casing 14 for the differential, and this housing has a cupped open end 46 having a curved inner wall and an attaching flange 47 which supports the spherical casing 48 enclosing the ball member 49 on the tubular casing 50 for the extension drive shaft. This casing has intermediate its ends a bearing 51 for said shaft, and one section of the casing is formed with an enlargement 52 to receive the end 53 of another similar section and provide a telescoping joint in the casing intermediate the rear and trailer axles.

The ball mountings at the ends of the tubular casing provide for its free movement in the steering adjustment of the trailer axle. In such adjustment the extension drive shaft swings upon its forward universal gearing while its rear end traverses an arc in the travel of the trailer truck. The telescoping connections between the universals and the worm gears provide for any increase in the length of radii in such travel and permits the use of a solid rigidly connected extension drive shaft between the universals which is very desirable in practical construction.

The operation of the invention will be apparent from the foregoing description and it will be seen that it provides simple means for the conversion of a four wheel vehicle into a six wheel vehicle having a four wheel drive with a steering control of the front and trailer wheels. This control involves the provision of a novel extension driving shaft for the trailer axle capable of pivotal movement at its ends and also axial telescoping play to permit the free oscillation of said axle in the steering movements.

While the specific construction of the several parts has been shown and described the invention is not confined thereto as changes and alterations may be made therein without departing from the spirit of the invention as recited in the following claims.

What I claim, is:

1. In an automobile driving mechanism, the combination of a rear axle and a trailer axle, driving gears for said axles, universal gearing having telescoping connection with each driving gear, a solid extension drive shaft rigidly connecting said universal gearings, housings for said driving gears, and a tubular casing for said drive shaft having ball and socket connections at said housings and a telescoping connection at their joint intermediate said axles.

2. In an automobile driving mechanism, the combination of a rear axle and a trailer axle, driving gears for said axles, universal gearing having telescoping connection with each driving gear, a solid extension drive shaft connected to said universal gearings, a rotatable truck for the trailer axle having a steering pin at its forward portion, a crank lever provided with a slotted arm embracing said pin, a rod from said lever, and a steering shaft connected to said rod.

3. In an automobile driving mechanism, the combination of a rear axle, a spaced trailer axle carried by a rotatable truck, a forwardly extending steering means from said truck, a pivoted and telescoping casing connecting said axles, driving worms for the axles, driving gearing having sliding connection with the adjacent ends of said worms, a rigid shaft, and a pivoted connection from the gearing secured to each end of the shaft intermediate the axles.

4. In an automobile driving mechanism, a driven axle and a trailer axle spaced therefrom, a worm gear for driving each axle provided with a sleeve at one end, universal gearings having a stub axle keyed to slide in said sleeve and an oppositely disposed socket, and a rigid extension axle secured in the sockets of the gearings at each end thereof.

5. In an automobile driving mechanism, a driven axle and a trailer axle spaced therefrom, a worm gear for driving each axle provided with a sleeve at one end, universal gearings having a stub axle keyed to slide in said sleeve and an oppositely disposed socket, a rigid extension axle secured in the sockets of the gearings at each end thereof, a housing for each worm gear having a spherical enclosure at one end, a tubular casing having a ball member disposed within said enclosure and extending about the universal gearing, and a telescoping joint at the ends of casing sections intermediate said axles.

In testimony whereof I affix my signature.

JOHAN J. REBMAN.